(12) United States Patent
Taylor et al.

(10) Patent No.: US 11,787,895 B2
(45) Date of Patent: Oct. 17, 2023

(54) SPRAYABLE MARINE FOAM

(71) Applicant: ICP CONSTRUCTION, INC., Andover, MA (US)

(72) Inventors: Anthony J. Taylor, Medina, OH (US); Andrew P. Shinko, Uniontown, OH (US)

(73) Assignee: ICP CONSTRUCTION, INC., Andover, MA (US)

( * ) Notice: Subject to any disclaimer, the term of this patent is extended or adjusted under 35 U.S.C. 154(b) by 463 days.

(21) Appl. No.: 17/067,886

(22) Filed: Oct. 12, 2020

(65) Prior Publication Data

US 2021/0108022 A1 Apr. 15, 2021

Related U.S. Application Data

(60) Provisional application No. 62/915,084, filed on Oct. 15, 2019.

(51) Int. Cl.
| | | |
|---|---|---|
| *C08G 18/64* | (2006.01) | |
| *C08G 18/08* | (2006.01) | |
| *C08G 18/48* | (2006.01) | |
| *C08J 9/14* | (2006.01) | |

(52) U.S. Cl.
CPC ............ *C08G 18/64* (2013.01); *C08G 18/14* (2013.01); *C08G 18/4804* (2013.01); *C08J 9/146* (2013.01); *C08J 2203/142* (2013.01); *C08J 2375/06* (2013.01); *C08J 2375/08* (2013.01)

(58) Field of Classification Search
CPC .... C08G 18/092; C08G 18/14; C08G 18/163; C08G 18/1808; C08G 18/1816; C08G 18/1833; C08G 18/2081; C08G 18/225; C08G 18/3806; C08G 18/4018; C08G 18/4211; C08G 18/4804; C08G 18/482; C08G 18/4829; C08G 18/4883; C08G 18/5021; C08G 18/64; C08G 18/7671; C08J 9/0023; C08J 9/0038; C08J 9/146; C08J 2203/142; C08J 2203/162; C08J 2207/04; C08J 2375/04; C08J 2375/06; C08J 2375/08

See application file for complete search history.

(56) References Cited

U.S. PATENT DOCUMENTS

| | | |
|---|---|---|
| 5,488,072 A | 1/1996 | Green |
| 6,354,556 B1 | 3/2002 | Ritchie et al. |
| 7,705,063 B2 | 4/2010 | Janzen et al. |
| 8,680,168 B2 | 3/2014 | Fishback et al. |
| 9,481,790 B2 * | 11/2016 | Taylor .................. C08G 18/242 |
| 2003/0114549 A1 | 6/2003 | Kalinowski et al. |
| 2005/0043423 A1 | 2/2005 | Schmidt et al. |
| 2010/0280141 A1 | 11/2010 | Loh et al. |
| 2015/0274967 A1 | 10/2015 | Taylor |
| 2016/0009847 A1 * | 1/2016 | Van Der Puy ..... C08G 18/3206 521/110 |
| 2016/0145374 A1 * | 5/2016 | Ishikawa ................ C08G 18/14 521/129 |

FOREIGN PATENT DOCUMENTS

WO 2009055436 A1 4/2009

OTHER PUBLICATIONS

PCT Search Report and Written Opinion of PCT/US20/55190 dated Jan. 29, 2021.
International Search Report and Written Opinion for PCT/US20/55190 dated Jan. 29, 2021.

* cited by examiner

*Primary Examiner* — John M Cooney
(74) *Attorney, Agent, or Firm* — Fredrikson & Byron, P.A.

(57) ABSTRACT

The invention generally pertains to the use of polyurethane foam blown by at least one blowing agent having a boiling point at atmospheric pressure of between ~−50° C. to less than ~5° C., including miscible blends thereof, which passes all United States Coast Guard Title 33, Part 183 specifications wherein the buoyant force of the froth polyurethane or polyisocyanurate foam is not reduced more than 5% after exposure to being immersed in a fully saturated gasoline vapor atmosphere, in reference fuel B, in reference oil No. 2, and in a 5% solution of $Na_3PO_4$.

8 Claims, No Drawings

SPRAYABLE MARINE FOAM

CROSS-REFERENCE TO RELATED APPLICATIONS

This is a continuation-in-part application of U.S. patent application Ser. No. 62/915,084 filed 15 Oct. 2019, the application fully incorporated by reference.

TECHNICAL FIELD

The invention described herein pertains generally to a composition and a method involving the use of polyurethane or polyisocyanurate foam blown by a blowing agent having a boiling point at atmospheric pressure of between ~−50° C. to less than ~5° C., which passes all United States Coast Guard Title 33, Part 183 specifications wherein the buoyant force of the froth polyurethane or polyisocyanurate foam is not reduced more than 5% after exposure to being immersed in a fully saturated gasoline vapor atmosphere at an elevated temperature, as well as being tested at room temperature in reference fuel B, in reference oil No. 2, and in a 5% solution of Na3PO4 for defined periods of time.

BACKGROUND OF THE INVENTION

United States Coast Guard Title 33, Part 183 specifications are difficult to meet with existing polyurethane or polyisocyanurate foams when it comes to buoyancy after exposure to fully saturated gasoline vapor atmosphere, in reference fuel B, in reference oil No. 2, and in a 5% solution of $Na_3PO_4$. It had been previously believed that only blowing agents having a boiling point at atmospheric pressure of between ~5° C. to ~50° C. were required to be successful. These are typically considered as pour-in-place polyurethane foams. This invention deviates from being limited to liquid blowing agents, to now include gaseous blowing agents, e.g., HFO-1234ze(E) or synonymously trans-1,3,3,3-tetrafluoropropene.

SUMMARY OF THE INVENTION

In accordance with one aspect of the present invention, there is provided a frothable foam which a polyurethane or polyisocyanurate foam is blown by at least one HFC blowing agent having a boiling point at atmospheric pressure of between ~−50° C. to less than ~5° C., including miscible blends thereof, which passes all United States Coast Guard Title 33, Part 183 specifications wherein the buoyant force of the foam is not reduced more than 5% after exposure to each of the following conditions, namely:
  being immersed in a fully saturated gasoline vapor atmosphere for 30 days at a minimum temperature of 38° C.;
  being immersed for 24 hours at 23° C. plus or minus 2° C. in reference fuel B;
  being immersed for 30 days at 23° C. plus or minus 2° C. in reference fuel B;
  being immersed for 24 hours at 23° C. plus or minus 2° C. in reference oil No. 2;
  being immersed for 30 days at 23° C. plus or minus 2° C. in reference oil No. 2;
  being immersed for 24 hours at 23° C. plus or minus 2° C. in a 5% solution of $Na_3PO_4$; and
  being immersed for 30 days at 23° C. plus or minus 2° C. in a 5% solution of $Na_3PO_4$.

In another aspect of the invention, the boiling point range of the HFO propellant ranges from ~−45° C. to ~0° C. In yet another aspect of the invention, the boiling point range of the HFO propellant is ~−19° C.

The polyurethane or polyisocyanurate foam comprises:
35-75 wt. % of a polyol blend which comprises:
  25-50 wt. % of at least one polyether polyol in the polyol blend present in a major amount, particularly an amine-initiated polyether, e.g., Poly-G 37-600;
  10-40 wt. % of at least one phthalic anhydride based aromatic polyester polyol present in a minor amount in the polyol blend;
30-65 wt. % of at least one other additive comprising at least one plasticizer and at least one flame retardant
1-5 wt. % of at least one surfactant;
1-5 wt. % of at least one catalyst, preferably of at least two catalysts, e.g., Dabco TMR-20; Polycat 12; DMDEE; Dabco TMR-31; and Dabco K-15;
up to 3 wt. % of water; and
the weight percentages combining to total 100%.

In a generic sense, the at least one phthalic anhydride based aromatic polyester polyol is

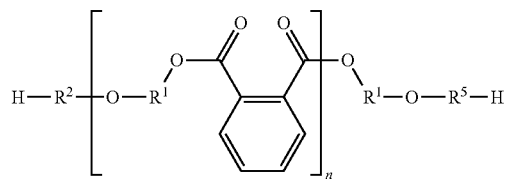

wherein
$R^1$ is selected from the group consisting of an alkylene group of from 2 to 10 carbon atoms, $—CH_2—R^3—CH_2—$, and $—(R^4O)_m—R^4—$;
$R^2$ and $R^5$ are independently $—[CH_2CH_2O]_x—$, $—[CH_2CH(CH_3)O]_x—$, $—[CH_2CH_2CH(CH_3)O]_x—$, or a random combination thereof;
$R^3$ is selected from the group consisting of

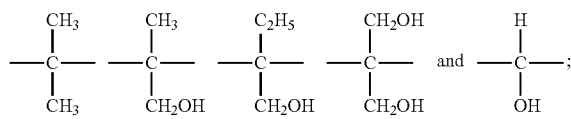

each $R^4$ is independently an alkylene group of from 2 to 4 carbon atoms; and
x, m, and n are independently from 1-200.

In a more preferred embodiment, the at least one phthalic anhydride based aromatic polyester polyol preferably is

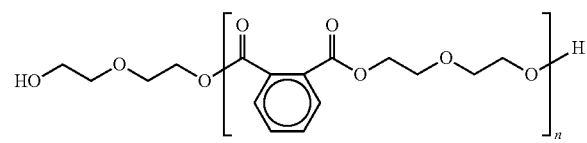

and further wherein
  an hydroxyl number in mg KOH/g is between 230-250 inclusive;
  a viscosity value at 25° C. is between 2,000-4,500 cP inclusive;
  an equivalent average weight is approximately 234; and
  n ranges from 1 to 100 inclusive;
  preferably having an average molecular weight of approximately 468.

The at least one polyether polyol preferably is an amine-initiated polyether polyol

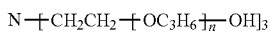

and further wherein
n is a number sufficient to achieve an average molecular weight of from about 150-750 inclusive, preferably to achieve a molecular weight of approximately 280.

The at least one other additive preferably is selected from the group comprising

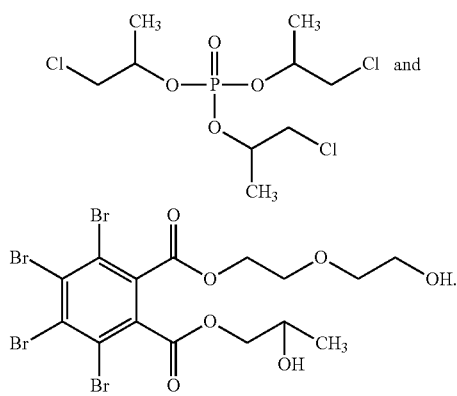

The at least one catalyst preferably is at least two catalysts

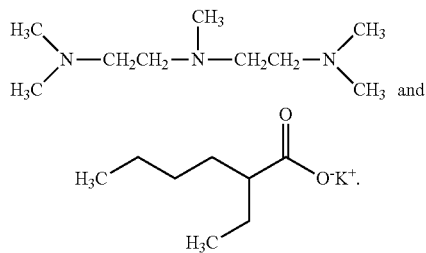

The water is added in an amount of approximately 1% by weight and preferably the at least one HFO blowing agent has a boiling point at atmospheric pressure of between ~−50° C. to less than ~5° C. inclusive, more preferably between ~−45° C. to ~0° C. inclusive, and most preferably, the boiling point range of the HFO propellant is ~−25° C. to less than ~−15° C. inclusive. The at least one HFO blowing agent is typically HFO-1234ze(E) or synonymously trans-1,3,3,3-tetrafluoropropene, optionally combined with a second blowing agent.

A process to achieve the above is also described involving the synthesizing a polyurethane or polyisocyanurate foam blown by at least one HFO blowing agent having a boiling point at atmospheric pressure of between ~−50° C. to less than ~5° C., which passes all United States Coast Guard Title 33, Part 183 specifications.

In accordance with another aspect of the present invention, there is provided a spray foam which can be applied using either cone nozzles or fan nozzles.

A process to achieve the above is also described involving the synthesizing a polyurethane or polyisocyanurate foam blown by at least one HFO blowing agent having a boiling point at atmospheric pressure of between ~−50° C. to less than ~5° C. inclusive, which passes all United States Coast Guard Title 33, Part 183 specifications.

The above and other aspects of the invention are achieved by using low pressure, high boiling point blowing agents, either neat or as a miscible blend or azeotrope with other blowing agents, recognizing that the invention encompasses future blowing agents having characteristics defined herein, particularly gaseous boiling points.

These and other objects of this invention will be evident when viewed in light of the detailed description and appended claims.

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

The invention relates to improved polyurethane and polyisocyanurate foams, which employ at least an effective amount of a low pressure, higher boiling point blowing agent(s) including miscible blends thereof.

As used in this application, a non-limiting exemplary definition for the term "polyurethane" or "PUR", which includes mixtures of polyurethanes, means a class of reaction polymers in which a urethane linkage is produced by reacting an isocyanate group, —N=C=O with an hydroxyl (alcohol) group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, $R-(N=C=O)_{n\geq 2}$ and a polyol is a molecule with two or more hydroxyl functional groups, $R'-(OH)_{n\geq 2}$. The reaction product is a polymer containing the urethane linkage, —RNHCOOR'—. Isocyanates will react with any molecule that contains an active hydrogen. Importantly, isocyanates react with water to form a urea linkage and carbon dioxide gas. Commercially, polyurethanes are produced by reacting a liquid isocyanate with a liquid blend of polyols, catalyst, and other additives. The isocyanate is commonly referred to in North America as the "A-side" or just the "iso". The blend of polyols and other additives is commonly referred to as the "B-side" or as the "poly". In Europe the definitions for the contents of the "A" and "B" compositions are reversed.

As used in this application, a non-limiting exemplary definition for the term "isocyanate", which includes mixtures of isocyanates, means a moiety which contains an —N=C=O arrangement of chemical elements. Molecules that contain two isocyanate groups are called diisocyanates. Isocyanates can be classed as aromatic, such as diphenylmethane diisocyanate ("MDI") or toluene diisocyanate ("TDI"); or aliphatic, such as hexamethylene diisocyanate ("HDI"). An example of a polymeric isocyanate is polymeric diphenylmethane diisocyanate, which is a blend of molecules with two-, three-, and four- or more isocyanate groups, with an average functionality of 2.7. Isocyanates can be further modified by partially reacting them with a polyol to form a prepolymer. Important characteristics of isocyanates are their molecular backbone, % —N=C=O content, functionality, and viscosity. Any organic polyisocyanate can be employed in the polyurethane or polyisocyanurate foam synthesis inclusive of aliphatic and aromatic polyisocyanates. Suitable organic polyisocyanates include aliphatic, cycloaliphatic, arylaliphatic, aromatic, and heterocyclic isocyanates which are well known in the field of polyurethane chemistry. Representative organic polyisocyanates correspond to the formula:

wherein R is a polyvalent organic radical which is either aliphatic, arylalkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane tri isocyanate, 2,4,6-toluene triisocyanates; the aromatic tetraisocyanates such as 4,4'-dimethyldiphenylmethane-2,2'5,5'-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-diphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene diisocyanate, polymethylene polyphenyl isocyanate, 2,4- and 2,6-toluene-diisocyanate, dianisidine diisocyanate, bitoylene isocyanate, naphthylene 1,4-diisocyanate, bis(4-isocyanatophenyl)methene, bis(2-methyl-4-isocyanatophenyl)methane, and the like.

As used in this application, a non-limiting exemplary definition for the term "polyol", which includes mixtures of polyols, can be any polyol which reacts in a known fashion with an isocyanate in preparing a polyurethane or polyisocyanurate foam. In one sense, polyol means a moiety which contains more than one hydroxyl group. Molecules that contain two hydroxyl groups are called diols, those with three hydroxyl groups are called triols, et cetera. Polyols are polymers in their own right. They are formed by base-catalyzed addition of propylene oxide ("PO"), ethylene oxide ("EO") onto a hydroxyl or amine containing initiator, or by polyesterification of a di-acid, such as adipic acid, with glycols, such as ethylene glycol ("EG") or dipropylene glycol ("DPG"). Polyols extended with PO or EO are polyether polyols. Polyols formed by polyesterification are polyester polyols. The choice of initiator, extender, and molecular weight of the polyol greatly affect its physical state, and the physical properties of the polyurethane polymer. Important characteristics of polyols are their molecular backbone, initiator, molecular weight, % primary hydroxyl groups, functionality, and viscosity. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; polyols derived from natural products (e.g. soy beans), glycerol; ethylene glycol; diethylene glycol; propylene glycol; graft copolymers of polyether polyols with a vinyl polymer; a copolymer of a polyether polyol with a polyurea; one or more of (a) condensed with one or more of (b) as illustrated by (a) glycerine, ethylene glycol, diethylene glycol, trimethylolpropane, ethylene diamine, pentaerythritol, soy oil, lecithin, tall oil, palm oil, castor oil; and (b) ethylene oxide, propylene oxide, a mixture of ethylene oxide and propylene oxide; or combinations thereof.

As used in this application, the Poly-G 37-600 polyether polyol will have the following characteristics.

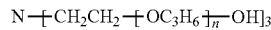

Hydroxyl Number, mg KOH/g 600

Water, % by wt., max. 0.08

Viscosity at 77° F. (25° C.), cP 380

Molecular Weight (average) 280 (150-750 permissible range)

Specific Gravity at 77° F. (25° C.), 1.051

As used in this application, one of the preferred phthalic anhydride based polyester polyols is and has the following physical characteristics.

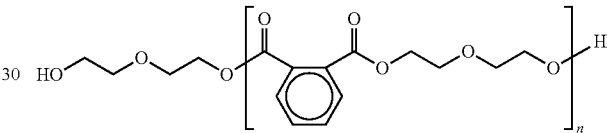

Hydroxyl Number, 230-250 (mg KOH/g)

Water, max. 0.15% by wt.

Acid Number, max. 0.6-1.0 mg KOH/g

Viscosity at 77° F. (25° C.), 2,000-4,500 cP

Equivalent Weight (average) 234 (preferred)

Molecular Weight (average) 468 (preferred)

Color, Gardner 4

Specific Gravity @ 25° C., 1.19 n ranges from 1 to 100.

As used in this application, the terephthalic anhydride based polyester polyol will mean and having the following characteristics.

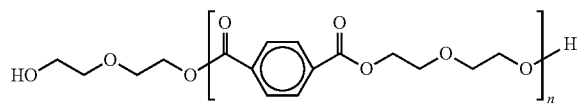

Hydroxyl Number, 335-365 (mg KOH/g)

Water, max. 0.15% by wt.

Acid No. 0.5-2.0 mg KOH/g

Viscosity @ 25° C. 2500-3500 cP

Specific Gravity @ 25° C., 1.233

Functionality 2.20

Equivalent Weight 160.3 n ranges from 1 to 75.

As used in this application, a more generic non-limiting exemplary definition for the term phthalic anhydride based polyester polyol is

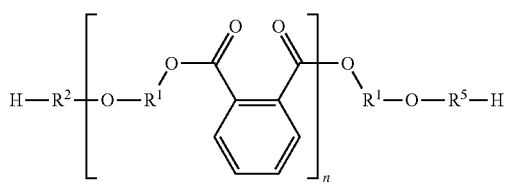

wherein $R^1$ is selected from the group consisting of an alkylene group of from 2 to 10 carbon atoms, $-CH_2-R^3-CH_2-$, and $-(R^4O)_m-R^4-$;

$R^2$ and $R^5$ are independently $-[CH_2CH_2O]_x-$, $[CH_2CH(CH_3)O]_x-$, $-[CH_2CH_2CH(CH_3)O]_x-$, or a random combination thereof;

$R^3$ is selected from the group consisting of

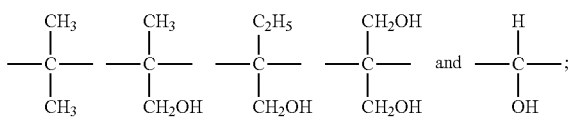

each $R^4$ is independently an alkylene group of from 2 to 4 carbon atoms; and x, m, and n are independently from between 1-200 inclusive.

As used in this application, a non-limiting exemplary definition for the term "polyol premix", which includes mixtures of polyol premixes, means a polyol premix which includes a catalyst. Useful catalysts are primary amines, secondary amines or most typical tertiary amines. Useful tertiary amine catalysts non-exclusively include dicyclohexylmethylamine; ethyldiisopropylamine; dimethylcyclohexylamine; dimethyl isopropylamine; methylisopropylbenzylamine; methylcyclopentylbenzylamine; isopropyl-sec-butyl-trifluoroethylamine; diethyl-(α-phenylethyl)amine, tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-α-phenylethyl)amine; or combinations thereof. Useful primary amine catalysts non-exclusively include: triphenylmethylamine and 1,1-diethyl-n-propylamine. Other useful amines include morpholines, imidazoles, ether containing compounds, and the like. These include dimorpholinodiethylether; N-ethylmorpholine; N-methylmorpholine; bis(dimethylaminoethyl)ether; imidazole; n-methylimidazole; 1,2-dimethylimidazol; dimorpholinodimethylether; N,N,N',N',N'',N''-pentamethyldiethylenetriamine; N,N,N',N',N'',N''-pentaethyldiethylenetriamine; N,N,N',N',N'',N''-pentamethyldipropylenetriamine; bis(diethylaminoethyl)ether; and bis(dimethylaminopropyl)ether. The polyol premix composition may contain an optional silicone surfactant. The silicone surfactant is used to form a foam from the mixture, as well as to control surface tension that impacts the size of the bubbles of the foam so that a foam of a desired open or closed cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise. The polyol premix composition may optionally contain a non-silicone surfactant, such as a non-silicone, non-ionic surfactant. These may include oxyethylated alkylphenols, oxyethylated fatty alcohols, paraffin oils, castor oil esters, ricinoleic acid esters, turkey red oil, groundnut oil, paraffins and fatty alcohols. A preferred non-silicone surfactant is LK-443 which is commercially available from Air Products Corporation.

As used in this application, a non-limiting exemplary definition for the term "polyisocyanurate" or "PIR", which includes mixtures of polyisocyanurates, means the reaction the reaction product of MDI and a polyol, which typically takes place at higher temperatures compared to the reaction temperature for the manufacture of PUR. Without being limited to any theory of operation or synthesis, at these elevated temperatures and in the presence of specific catalysts, MDI will first react with itself, producing a stiff, ring molecule, which is a reactive intermediate (a tri-isocyanate isocyanurate compound). Remaining MDI and the tri-isocyanate react with polyol to form a complex poly(urethane-isocyanurate) polymer, which is foamed in the presence of a suitable blowing agent. This isocyanurate polymer has a relatively strong molecular structure, because of the combination of strong chemical bonds, the ring structure of isocyanurate and high cross link density, each contributing to the greater stiffness than found in comparable polyurethanes. The greater bond strength also means these are more difficult to break, and as a result a PIR foam is chemically and thermally more stable: breakdown of isocyanurate bonds is reported to start above 200° C., compared with urethane at 100 to 110° C. PIR typically has an MDI/polyol ratio, also called its index (based on isocyanate/polyol stoichiometry to produce urethane alone), of between 200 and 500. By comparison PUR indices are normally around 100. As the index increases material stiffness but also brittleness also increase, although the correlation is not linear. Depending on the product application greater stiffness, chemical and/or thermal stability may be desirable. As such PIR manufacturers offer multiple products with identical densities but different indices in an attempt to achieve optimal end use performance.

As used in this application, a non-limiting definition for the term "blowing agent" which includes miscible mixtures and azeotropes of blowing agents, means a propellant or solvent which are useful and provide efficacy to various applications in the form of insulation performance, pressure performance, or solubility, without deleterious effect due to molar gas volume, flammability migration, or GWP reduction, yet which have a vapor pressure within defined limits as defined herein. Exemplary and non-limiting blowing agents include HFC-245fa (Honeywell Intl.), namely 1,1,1, 3,3 pentafluoropentane or FEA-1100 (DuPont), namely 1,1, 1,4,4,4 hexafluoro-2-butene, called Opteon 1100 for the "Z" configuration and Opteon 1150 for the "E" configuration and Solstice® GBA, namely HFO-1234ze (equivalently trans-1,3,3,3-tetrafluoropropene).

It is often necessary or even desirable to mitigate the global warming potential ("GWP") of blowing agent, aerosol, or solvent compositions. As used herein, GWP is measured relative to that of carbon dioxide and over a 100-year time horizon, as defined in "The Scientific Assessment of Ozone Depletion, 2002, a report of the World Meteorological Association's Global Ozone Research and Monitoring Project." In certain preferred forms, the present compositions also preferably have an Ozone Depletion Potential ("ODP") of not greater than 0.05, more preferably not greater than 0.02 and even more preferably about zero. As used herein, "ODP" is as defined in "The Scientific Assessment of Ozone Depletion, 2002, A Report of the World Meteorological Association's Global Ozone Research and Monitoring Project."

As used herein, a non-limiting definition for the term "co-blowing agent" which includes mixtures or miscible blends and/or azeotropes of blowing agents, means a one or more co-blowing agents, co-propellants, or co-solvents which are useful and provide efficacy to various applications in the form of insulation performance, pressure performance, or solubility, without deleterious effect due to molar gas volume, flammability mitigation, or GWP reduction. These co-agents include but are not limited to: one or more additional components of hydrofluorocarbons, $C_1$ to $C_6$ hydrocarbons, $C_1$ to $C_6$ alcohols, ethers, diethers, aldehydes, ketones, hydrofluoroethers, $C_1$ to $C_4$ chlorocarbons, methyl formate, water, carbon dioxide, $C_3$ to $C_4$ hydrofluoroolefins, and $C_3$ to $C_4$ hydrochlorofluoroolefins. Examples of these non-exclusively include one or more of difluoromethane, trans-1,2-dichloroethylene, difluoroethane, 1,1,1,2,2-pentafluoroethane, 1,1,2,2-tetrafluoroethane, 1,1,1,2-tetrafluoroethane, 1,1,1-trifluoroethane, 1,1-difluoroethane, fluoroethane, hexafluoropropane isomers, including HFC-236fa, pentafluoropropane isomers of HFC-245fa, heptafluoropropane isomers, including HFC-227ea, hexafluorobutane isomers, and pentafluorobutane isomers including HFC-365mfc, tetrafluoropropane isomers, and trifluoropropene isomers (HFO-1243). Specifically included are all molecules and isomers of HFO-1234, including 1,1,1,2-tetrafluoropropene (HFO-1234yf), and cis- and trans-1,2,3,3-tetrafluoropropene (HFO-1234ze), HFC-1233zd, and HFC-1225ye. Preferred co-blowing agents non-exclusively include: hydrocarbons, methyl formate, halogen containing compounds, especially fluorine containing compounds and chlorine containing compounds such as halocarbons, fluorocarbons, chlorocarbons, fluorochlorocarbons, halogenated hydrocarbons such as hydrofluorocarbons, hydrochlorocarbons, hydrofluorochlorocarbons, hydrofluoroolefins, hydrochlorofluoroolefins, $CO_2$, $CO_2$ generating materials such as water, and organic acids that produce $CO_2$ such as formic acid. Examples non-exclusively include low-boiling, aliphatic hydrocarbons such as ethane, propane(s), i.e. normal pentane, isopropane, isopentane and cyclopentane; butanes(s), i.e. normal butane and isobutane; ethers and halogenated ethers; trans 1,2-dichloroethylene, pentafluorobutane; pentafluoropropane; hexafluoropropane; and heptafluoropropane; 1-chloro-1,2,2,2-tetrafluoroethane (HCFC-124); and 1,1-dichloro-1-fluoroethane (HCFC-141b) as well as 1,1,2,2-tetrafluoroethane (HFC-134); 1,1,1,2-tetrafluoroethane (HFC-134a); 1-chloro 1,1-difluoroethane (HCFC-142b); 1,1,1,3,3-pentafluorobutane (HFC-365mfc); 1,1,1,2,3,3,3-heptafluoropropane (HCF-227ea); trichlorofluoromethane (CFC-11), dichlorodifluoromethane (CFC-12); 1,1,1,3,3,3-hexafluoropropane (HFC-236fa); 1,1,1,2,3,3-hexafluoropropane (HFC-236ea); difluoromethane (HFC-32); difluoroethane (HFC-152a); trifluoropropenes, pentafluoropropenes, chlorotrifluoropropenes, tetrafluoropropenes including 1,1,1,2-tetrafluoropropene (HFO-1234yf), 1,1,1,2,3-pentafluoropropene (HFO-1225ye), and 1-chloro-3,3,3-trifluoropropene (HCFC-1233zd). Combinations of any of the aforementioned are useful. The relative amount of any of the above noted additional co-blowing agents, as well as any additional components included in present compositions, can vary widely within the general broad scope of the present invention according to the particular application for the composition, and all such relative amounts are considered to be within the scope hereof.

As used herein, a non-limiting definition for the term, "effective amount" means a quantity sufficient to improve the result of the foaming operation when compared to a control without the added reactant.

As used herein, a non-limiting definition for the term, "lower boiling point blowing agent" means a blowing agent having a boiling point at atmospheric pressure of between ~−50° C. to less than ~5° C. inclusive.

As used herein, a non-limiting definition for the term "approximately" means a deviation from the stated end points of a range of 10%.

The polymerization reaction is catalyzed by tertiary amines, such as dimethylcyclohexylamine, and organometallic compounds, such as dibutyltin dilaurate or bismuth octanoate. Furthermore, catalysts can be chosen based on whether they favor the urethane (gel) reaction, such as 1,4-diazabicyclo[2.2.2]octane (also called DABCO or TEDA), or the urea (blow) reaction, such as bis-(2-dimethylaminoethyl) ether, or specifically drive the isocyanate trimerization reaction, such as potassium octoate.

At its simplest level, the distinction between PIR and PUR polymers is not large. The proportion of MDI is higher than for PUR and instead of a polyether polyol, a polyester derived polyol is used in the reaction. Catalysts and additives used in PIR formulations also differ from those used in PUR.

The foam of the invention dispenses from relatively inexpensive pressurized, but considered low-pressure (130-225 psi) cylinders rather than high pressure dispensing equipment (>1,000 psi as typically used in impingement mixing) of the prior art. The use of cylinder dispensed polyurethane foam does not have upfront capital costs for equipment as would be necessary with high pressure dispensed polyurethane foam, which is in the order of $30,000 to $100,000 for the special handling equipment required, including proportioning units and spray guns.

Example #1

A typical polyurethane foam was made in by combining two polyols, e.g., poly-G 37-600 and Stepanpol PS 2352 in the ratios illustrated in Table I. Plasticizer, flame retardant, surfactants, catalysts & water were also added in the ratios illustrated in Table I to form the "B"-side cylinder. Diphenylmethane diisocyanate was used to form the "A"-side cylinder. The propellant HFC-134a was employed for both the "A" and "B" cylinders in the quantities illustrated in Table II.

Example #2

A new formulation polyurethane foam was made by combining two polyols (poly-G 37-600) and Stepanpol® PS-2352 in the ratios illustrated in Table I. Plasticizer, flame retardant, surfactants & catalysts were also added in the ratios illustrated in Table I to form the "B"-side cylinder. Diphenylmethane diisocyanate was used to form the "A"-side cylinder. The propellant HFC-134a was employed for both the "A" and "B" cylinders in the quantities illustrated in Table II.

Example #3

A new formulation polyurethane foam was made by combining two polyols (poly-G 37-600) and Stepanpol® PS-2352 in the ratios illustrated in Table I. Plasticizer, flame retardant, surfactants & catalysts were also added in the ratios illustrated in Table I to form the "B"-side cylinder. Diphenylmethane diisocyanate was used to form the "A"-side cylinder. The propellant HFO-1234ze was employed for both the "A" and "B" cylinders in the quantities illustrated in Table II.

TABLE I

| Component | Formula | Ex. #1 (wt %) | Ex. #2 (wt %) | Ex. #3 (wt %) |
|---|---|---|---|---|
| Polyether polyol | N—[CH$_2$CH$_2$—[OC$_3$H$_6$]$_n$—OH]$_3$ | 40.0% | 40.0% | 40.0% |
| Polyether polyol | 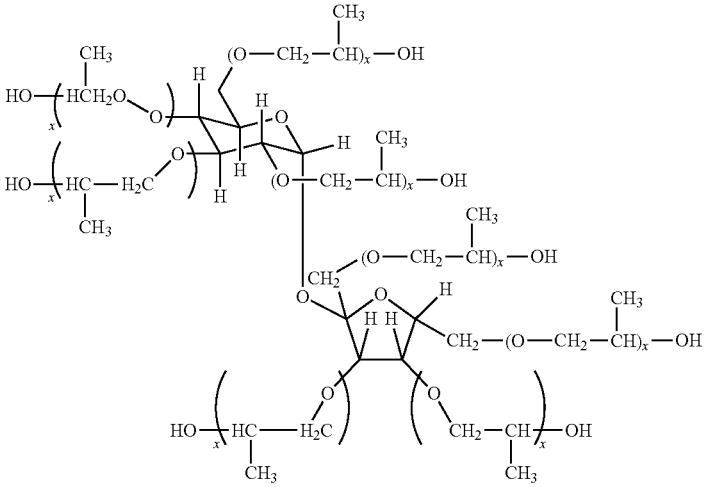 | | | |
| Polyester polyol | 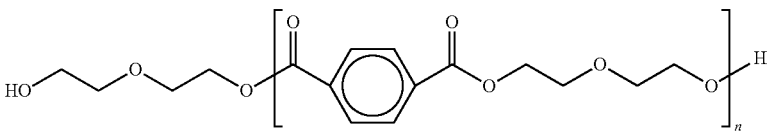 | | | |
| Polyester polyol | 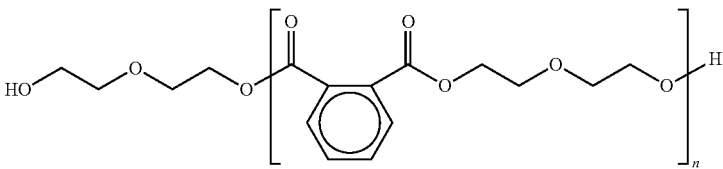 | 27.7% | 28.9% | 27.7% |
| Additive | 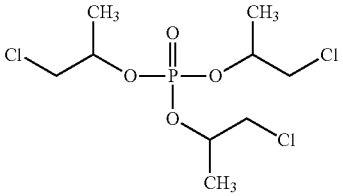 | 27.1% | 26.7% | 27.1% |
| Additive | 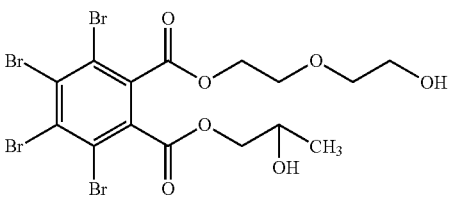 [SMILES: CC(O)COC(=O)c1c(Br)c(Br)c(Br)c(Br)c1C(=O)OCCOCCO] | | | |
| Surfactant | B8870 surfactant, which is a linear polyether polydimethyl siloxane copolymer siloxane | 2.0% | 2.0% | 2.0% |
| Surfactant | LK 443 Dabco® proprietary non-silicone containing organic surfactant having a viscosity at 25° C. of 2600 cps, 20% sol. in water, and an average OH# of 36 containing 0.1-1% N-vinyl-2-pyrrolidone | | | |
| Catalyst | 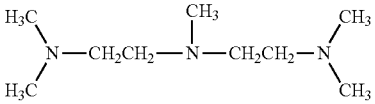 | | | |

TABLE I-continued

| Component | Formula | Ex. #1 (wt %) | Ex. #2 (wt %) | Ex. #3 (wt %) |
|---|---|---|---|---|
| Catalyst Dabco K-15 | (structure) | 1.8% | | |
| Catalyst DMDEE (dimorpholiodiethyl ether) | (structure) | 0.1% | | |
| Catalyst Dabco TMR-20 | | | 1.0% | 1.0% |
| Catalyst Dabco TMR-31 | | | 0.5% | |
| Polycat®-12 (Dicyclohexylmethyl amine) | (structure) | | 1.2% | 1.2% |
| Other | Water | | 1.0% | 1.0% |
| | Totals | 100% | 100% | 100% |

TABLE II

| Composition | Example #1 | Example #2 | Example #3 |
|---|---|---|---|
| "A-side" | | | |
| MDI | 94% | 94% | 94.0% |
| HFO-1234ze (trans-1,3,3,3-tetrafluoropropene) propellant | | | 6% |
| HFC-134a | 6% | 6% | |
| "B"-side | | | |
| "B"-side blend of Table I | 89% | 90% | 89% |
| HFC-134a | 11% | 10% | |
| HFO-1234ze (trans-1,3,3,3-tetrafluoropropene) | | | 11% |

The examples above had gel times of 30 seconds or more, attributable to the lower catalyst levels in combination with the use of less aggressive catalysts.

One important test for flotation purposes, is the ability of any synthesized foam to pass the U.S. Coast Guard Title 33, Part 183 test, which employs a series of ASTM standards, namely ASTM D471 & ASTM D2842. The results of the testing for Example #1, and Example #2 illustrated in Table IV (with physical characteristics in Table III) and the adjacent P/F columns are a shorthand notation as to whether the composition passed or failed the identified testing protocol.

TABLE III for Example #1

| Density (pcf) | II Comp. (psi) |
|---|---|
| 1.96 | 16.13 |
| 2.25 | 18.99 |
| 2.34 | 24.80 |

TABLE IV for Example #1

| | Initial | 3 mo. | 6 mo. | 9 mo. | 12 mo. |
|---|---|---|---|---|---|
| A/B | 0.84 | 1.13 | 1.01 | Clogged A-side | 0.99 |
| Gel | 47 | 57 | 55 | | 65 |
| Tack | 63 | 84 | 87 | | 111 |
| ρ | 2.55 | 2.13 | 2.30 | | 2.21 |
| CDR | 1.00 | 1.21 | 1.17 | | 1.38 |
| R | 6.42 | 5.94 | 5.93 | | 6.23 |
| % CCC | 93.56 | 94.89 | 91.95 | | 90.02 |
| II comp | 12.58 | 23.59 | 19.35 | | 18.30 |

TABLE V for Example #2

| | Initial | 3 mo. | 6 mo. | 9 mo. | 12 mo. |
|---|---|---|---|---|---|
| A/B | 1.19 | | 2.98 | | 1.20 |
| Gel | 93 | | 68 | | 58 |
| Tack | 140 | | 296 | | 92 |
| ρ | 3.22 | | X | | X |
| CDR | 1.00 | | 0.73 | | 0.63 |
| R | 5.68 | | X | | X |
| % CCC | 93.87 | | X | | X |
| II comp | 34.17 | | X | | X |

TABLE VI for Example #3

| | Initial | 4.5 mo. |
|---|---|---|
| A/B | 1.06 | 1.06 |
| Gel (sec) | 93 | 53 |

TABLE VI-continued for Example #3

| | Initial | 4.5 mo. |
|---|---|---|
| Tack (sec) | 140 | 77 |
| ρ | | |
| CDR | | |
| R | | 5.55 |
| % CCC | | 90.43 |
| II comp | | 13.93 |
| *dimensional stability (RT) | | 0.60 |
| dimensional stability (−20° C.) | | −0.16 |
| dimensional stability (70° C.) - dry | | 0.94 |
| dimensional stability (70° C.) - humid | | 3.74 |

*dimensional stability is defined as the post volumetric expansion/contraction of an approximately 4" × 4" × 1" rectangular cured foam solid

TABLE VII

| Test | Requirements | Ex #1 P/F | Ex #2 P/F | Ex #3 P/F |
|---|---|---|---|---|
| Effects of Fluids 24 hrs. @ 23° C. Ref Fuel "B" | −5% max | P | NT | P |
| Effects of Fluids 30 days @ 23° C. Ref Fuel "B" | −5% max | P | NT | P |
| Effects of Fluids 24 hrs. @ 23° C. IRM 902 Oil | −5% max | P | NT | P |
| Effects of Fluids 30 days @ 23° C. IRM 902 Oil | −5% max | P | NT | P |
| Effects of Fluids 24 hrs. @ 23° C. 5% Na$_3$PO$_4$ | −5% max | P | NT | P |
| Effects of Fluids 30 days @ 23° C. 5% Na$_3$PO$_4$ | −5% max | P | NT | P |
| Effects of Fluids 30 Days at 38° C. gasoline vapor | −5% max | P | NT | P |

*NT = not tested due to failure of other physical properties

As illustrated above, Title 33: Navigation and Navigable Waters has several stringent requirements, as illustrated in Chapter I: Coast Guard, Department of Homeland Security, Subchapter S: Boating Safety, Part 183: Boats and Associated Equipment, Subpart F: Flotation Requirements for Inboard Boats, Inboard/Outdrive Boats, and Airboats.

§ 183.114—Test of Flotation Materials.

(a) Vapor test. The flotation material must not reduce in buoyant force more than 5% after being immersed in a fully saturated gasoline vapor atmosphere for 30 days at a minimum temperature of 38° C.

(b) 24-hour gasoline test. The flotation material must not reduce in buoyant force more than 5% after being immersed for 24 hours at 23° C. plus or minus 2° C. in reference fuel B, of ASTM D 471 (incorporated by reference, see § 183.5).

(c) 30-day gasoline test. The flotation material must not reduce in buoyant force more than 5% after being immersed for 30 days at 23° C. plus or minus 2° C. in reference fuel B, of ASTM D 471 (incorporated by reference, see § 183.5).

(d) 24-hour oil test. The flotation material must not reduce in buoyant force more than 5% after being immersed for 24 hours at 23° C. plus or minus 2° C. in reference oil No. 2, of ASTM D 471 (incorporated by reference, see § 183.5).

(e) 30-day oil test. The flotation material must not reduce in buoyant force more than 5% after being immersed for 30 days at 23° C. plus or minus 2° C. in reference oil No. 2, of ASTM D 471 (incorporated by reference, see § 183.5).

(f) 24-hour bilge cleaner test. The flotation material must not reduce in buoyant force more than 5% after being immersed for 24 hours at 23° C. plus or minus 2° C. in a 5% solution of trisodium phosphate in water.

(q) 30-day bilge cleaner test. The flotation material must not reduce in buoyant force more than 5% after being immersed for 30 days at 23° C. plus or minus 2° C. in a 5% solution of trisodium phosphate in water.

(h) The buoyant force reduction in paragraphs (a) through (g) of this section is measured in accordance with ASTM D 2842 (incorporated by reference, see § 183.5).

What is illustrated above is that it is possible to use gaseous HFO blowing agents and still achieve the required performance of Marine Foams which pass Title 33.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A two component polyurethane or polyisocyanurate foam blown by at least one hydrofluoroolefin blowing agent, the two component foam synthesized from two sets of pressurized reactant components which comprise an A-side and a B-side:
   the B-side reactant components comprising a polyol blend:
      25-50 wt. % of at least one polyether polyol in the polyol blend present in a major amount;
      10-40 wt. % of at least one phthalic anhydride based aromatic polyester polyol present in a minor amount in the polyol blend;
      30-65 wt. % of at least two additives comprising at least one plasticizer and at least one flame retardant;
      1-5 wt. % of at least one surfactant;
      1-5 wt. % of at least one catalyst;
      0.5-3 wt. % of water;
      the at least one hydrofluoroolefin blowing agent having a boiling point at atmospheric pressure of between ~ −45° C. to ~ 0° C. inclusive and miscible blends thereof, and
   the weight percentages of all of the B-side reactant components combining to total 100%,
   the A-side reactive components comprising:
      a poly- or diisocyanate; and
      the at least one hydrofluoroolefin blowing agent having a boiling point at atmospheric pressure of between ~ −45° C. to ~ 0° C. inclusive and miscible blends thereof, and
   wherein the foam passes all United States Coast Guard Title 33, Part 183 specifications wherein the buoyant force of the foam is not reduced more than 5% after exposure to all of the conditions identified in the United States Coast Guard Title 33, Part 183 specifications.

2. The polyurethane foam of claim 1 wherein
   the at least one phthalic anhydride based aromatic polyester is

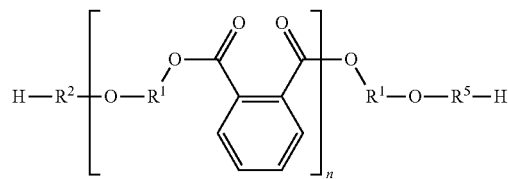

wherein
R$^1$ is selected from the group consisting of an alkylene group of from 2 to 10 carbon atoms, —CH$_2$—R$^3$—CH$_2$—, and —(R$^4$O)$_m$—R$^4$;
R$^2$ and R$^5$ are independently —[CH$_2$CH$_2$O]$_x$—, [CH$_2$CH(CH$_3$)O]$_x$—, —[CH$_2$CH$_2$CH(CH$_3$)O]$_x$—, or a random combination thereof;
R$^3$ is selected from the group consisting of

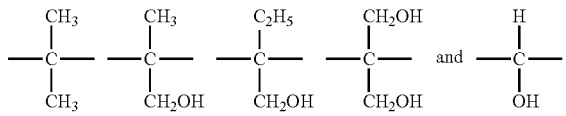

R$^4$ is independently an alkylene group of from 2 to 4 carbon atoms; and
x, m, and n are independently from 1-200 inclusive.

3. The polyurethane foam of claim 2 wherein the at least one phthalic anhydride based aromatic polyester polyol is

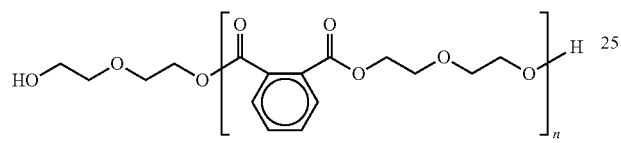

and further wherein
n ranges from 1 to 100 inclusive.

4. The polyurethane foam of claim 2 wherein the at least one polyether polyol is

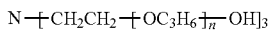

and further wherein
n is a number sufficient to achieve ab average molecular weight of between 150-750 inclusive.

5. The polyurethane foam of claim 4 wherein the at least one other additive is selected from the group comprising

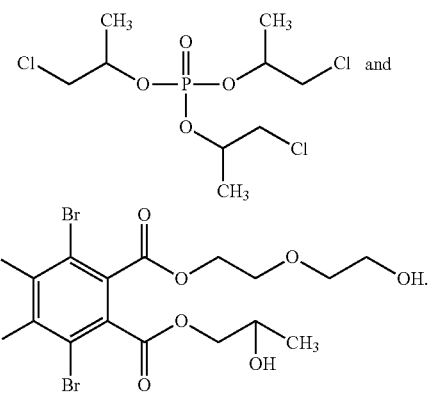

6. The polyurethane foam of claim 1 wherein the water is added in an amount of approximately 1% by weight.

7. The polyurethane foam of claim 1 wherein the at least one blowing agent is trans-1,3,3,3-tetrafluoropropene.

8. The polyurethane foam of claim 1 wherein all of the conditions identified by the United States Coast Guard Title 33, Part 183 specifications for which the buoyant force of the foam is not reduced more than 5% after exposure are as follows:
being immersed in a fully saturated gasoline vapor atmosphere for 30 days at a minimum temperature of 38° C.;
being immersed for 24 hours at 23° C. plus or minus 2° C. in a reference fuel B;
being immersed for 30 days at 23° C. plus or minus 2° C. in the reference fuel B;
being immersed for 24 hours at 23° C. plus or minus 2° C. in a reference oil No. 2;
being immersed for 30 days at 23° C. plus or minus 2° C. in the reference oil No. 2;
being immersed for 24 hours at 23° C. plus or minus 2° C. in a 5% solution of Na$_3$PO$_4$; and
being immersed for 30 days at 23° C. plus or minus 2° C. in a 5% solution of Na$_3$PO$_4$.

* * * * *